United States Patent
Ohno et al.

(10) Patent No.: US 6,950,915 B2
(45) Date of Patent: Sep. 27, 2005

(54) DATA STORAGE SUBSYSTEM (75) Inventors: Hiroshi Ohno, Odawara (JP); Kiichiro Urabe, Isehara (JP); Toshio Nakano, Chigasaki (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 10/394,631

(22) Filed: Mar. 21, 2003

(65) Prior Publication Data

US 2003/0229764 A1 Dec. 11, 2003

(30) Foreign Application Priority Data

Jun. 5, 2002 (JP) .................................... 2002-163705

(51) Int. Cl.[7] ............................................. G06F 12/00
(52) U.S. Cl. ...................... 711/162; 711/161; 707/204
(58) Field of Search ............................. 711/161–162; 707/202–204; 714/6

(56) References Cited

U.S. PATENT DOCUMENTS

| | | | | |
|---|---|---|---|---|
| 5,751,997 A | * | 5/1998 | Kullick et al. .............. | 711/162 |
| 5,787,485 A | * | 7/1998 | Fitzgerald et al. .......... | 711/162 |
| 5,940,841 A | | 8/1999 | Schmuck et al. | |
| 6,467,034 B1 | * | 10/2002 | Yanaka ....................... | 711/162 |
| 6,530,003 B2 | * | 3/2003 | Bakke et al. ............... | 711/162 |
| 6,728,848 B2 | * | 4/2004 | Tamura et al. ............. | 711/162 |
| 6,772,306 B2 | * | 8/2004 | Suzuki et al. .............. | 711/162 |
| 2002/0016827 A1 | | 2/2002 | McCabe et al. | |
| 2003/0079083 A1 | | 4/2003 | Lubbers et al. | |
| 2003/0126107 A1 | | 7/2003 | Yamagami | |
| 2003/0177321 A1 | | 9/2003 | Watanabe | |

FOREIGN PATENT DOCUMENTS

| | | |
|---|---|---|
| EP | 0617362 A1 | 9/1994 |
| JP | 11-305947 | 11/1999 |
| JP | 2000-305856 | 11/2000 |

* cited by examiner

*Primary Examiner*—Nasser Moazzami
(74) *Attorney, Agent, or Firm*—Townsend and Townsend and Crew LLP

(57) ABSTRACT

A method for copying information from a first storage subsystem to a second storage subsystem is disclosed. The first and second storage subsystems are provided in a data storage system. The method comprises transmitting first data block from the first storage subsystem to the second storage subsystem, the first storage subsystem being associated with a first host computer and the second storage subsystem being associated with a second host computer; and transmitting first attribute information from the first storage subsystem to the second storage subsystem without intervention from the first host computer.

19 Claims, 8 Drawing Sheets

FIG.1

OVERALL BLOCK DIAGRAM

11a FIRST DATA STORAGE SUBSYSTEM

11b SECOND DATA STORAGE SUBSYSTEM

FIG.2

ATTRIBUTE TABLE CONFIGURATION — 34

| LUN | RESERVATION CONTROL INFORMATION | UPDATE ACCESS ENABLE KEY | ACTIVE HOST ID | ......... | USER AREA |
|---|---|---|---|---|---|
| 00:00 | 0 | 321A | — | ......... | |
| 00:01 | 1, TID=7 | — | — | ......... | 3FC00129..... |
| ⋮ | ⋮ | ⋮ | ⋮ | | ⋮ |
| FF:FF | 0 | — | 00-00-3C | ......... | |

REMOTE - COPY STOP

(a) REMOTE - COPY NORMAL OPERATION

(b) WHILE REMOTE - COPY STOPS (c) AFTER REMOTE - COPY RESTARTS (d) AFTER TAKE - OVER

SYNCHRONOUS AND ASYNCHRONOUS TRANSFER METHODS (a) SYNCHRONOUS TRANSFER METHOD (b) ASYNCHRONOUS TRANSFER METHOD

DATA STORAGE SUBSYSTEM

CROSS-REFERENCES TO RELATED APPLICATIONS

The present application is related to and claims priority from Japanese Patent Application No. 2002-163705, filed on Jun. 5, 2002.

BACKGROUND OF THE INVENTION

The present invention relates to a data storage system including a plurality of storage subsystem and a method of storing data therein.

In recent years, the computer storage systems are configured to handle a huge amount of data. In addition, data is updated very frequently in these computer systems. A method for backing up large amounts of data and restoring a system to its normal state when an error occurs are important concerns in this technology field. One method used to address this concern has been a remote-copying technique. According to the technique, the data storage subsystems (external storage units), each having a magnetic disk array, are disposed away from each another. These data storage subsystems are then connected to each another through a communication path, so that data updated in one of these subsystems is also copied automatically to another subsystem.

This remote-copying technique enables recovery of data even when the primary data storage subsystem experiences a failure from a secondary storage subsystem. Accordingly, the data consistency between the primary and secondary storage subsystems should be maintained at regular intervals, preferably very frequently. However, a copy stop often occurs unexpectedly. To address this concern, therefore, each application program is required to update the data in the right in the copy source subsystem to ensure that the data consistency between the primary and secondary storage subsystems are maintained.

A conventional remote-copy technique is disclosed in JP-A No. 6-290125. JP-A No. 11-85408 also discloses another conventional technique that employs an asynchronous method to keep the data updating order. The method requires no confirmation of each data copy completion through a host computer.

In one embodiment, each program that runs in the host computer connected to a data storage subsystem often has enhanced functions for handling data, so that it can instruct the data storage subsystem not only to store data, but also to control other additional control processing. Generally, the controlling is done to logical volumes. The logical volume is a unit of data storage areas used by the host computer when accessing the storage subsystems.

One example of the additional controlling is controlling access to a logical volume from a plurality of host computers. The control is preferably made for enabling/disabling such operations as referring to and updating of each logical volume from each host computer or each program instance independently and the enable/disable setting should preferably be changed dynamically. When accesses to a target logical volume from each host computer is controlled independently, the data storage subsystem identifies the host computer according to the host computer ID or the ID of the port connected to the host computer. The simplest controlling method of accesses to a logical volume from each host computer is to use a reservation function that enables only a single host computer to access the logical volume. On the other hand, when the access control is made with respect to each program instance, the controlling can be realized with a function for registering a key value for enabling accesses and a controlling method that enables only a request having the key value in its access command such as a data read/write one to access the target logical volume.

As another example of the access control, there is a function for reporting the state of a target logical volume. For example, while the ID information of a host computer (A) that is accessing a logical volume at a certain time is registered, if the ID information is returned to another host computer (B) in response to a request therefrom, the host computer (B) can know that the logical volume is used, so that the host computer (B) can use the knowledge to determine the subsequent operation. In addition, instead of the LUN (Logical Unit Number) specific to a subject data storage subsystem, a proper tag information added to the connected host computer can be used to recognize the target logical volume.

The program can also make the access controlling by its own function without using the controlling function provided from the target data storage subsystem. For example, when a plurality of program instances distributed in a plurality of host computers are combined for an operation, they exchange necessary information through a common data storage subsystem. In this connection, they use a method for reading/writing necessary information in a working memory area in the data storage subsystem without writing the data in the logical volume of the data storage subsystem. Consequently, writing in physical disks is omitted, thereby data exchange among the program instances can be speeded up significantly. In this connection, the data storage subsystem comes to provide each of the program instances with control commands for reading and writing given working information.

The information used for control processes in those data storage subsystems or generated from those control processes is stored in a memory area shared by the processors in those data storage subsystems. Hereinafter, those information will be referred to as "attribute information" in this specification. Each attribute information, in each example described above, includes items of access setting list, reservation control information, access enabling key value, active host ID, logical volume tag information, given working information itself to be read/written by programs, etc.

Each of those additional control operations is closed in each data storage subsystem. Attribute information generated by such an additional control operation has not been subjected to the remote-copy operation as described above. However, when a disaster occurs in a duplicate side data storage subsystem and it is to be replaced with another so as to be recovered from the disaster, the attribute information having been stored in the subsystem should preferably be used so as to restore the data therein more accurately.

Conventionally, when the attribute information is to be used, the information has been exchanged between the host computers connected to the subject data storage subsystems through communications. For example, the JP-A No. 11-305947 discloses a technique for a magnetic disk control unit to receive an attention report command information from a host computer, then transfer the information to a remote magnetic disk control unit, thereby the report is sent to a remote host computer from the remote magnetic disk control unit.

SUMMARY OF THE INVENTION

According to the conventional techniques described above, host computers have been required to communicate with each other to exchange and use attribute information. When copying the attribute information, each subject data storage subsystem has also been required to take the remote-copy state into consideration. The copy operation has thus been complicated. In the embodiment of the present invention, however, the attribute information is copied to the subject back-up side (duplicate side) data storage subsystem so that the back-up side subsystem can use the attribute information automatically while the host computer does not know it at all.

Furthermore, according to the conventional techniques described above, attribute information has been updated between host computers while data has been updated between data storage subsystems respectively. This is why basically the updating order cannot be kept between attribute updating and data updating, although the updating order has been achieved with difficulty when the program in the subject host computer manages the order in close cooperation with the subject data storage subsystems. However, the cooperation is not only difficult, but also comes to generate a large overhead. Therefore, the performance itself is not so high. On the other hand, in the embodiment of the present invention, data and attribute information are updated in duplicate side subsystems quickly in the right order they are updated in the original side subsystem while the host computer does not know it at all.

To make both of original and copied attribute information match completely as described above, the resynchronization must be achieved between both original and copied information, for example, after a remote-copy operation, stopped once, then restarted or after the copy direction is changed. To achieve the resynchronization, a difference of attribute information generated between those two operations is copied while the host computer does not know it in the embodiment of the present invention, thereby the attribute information is resynchronized quickly.

Recently, some users come to expect using of the above described functions for remote-copying over a plurality of data storage subsystems to improve the error resistance. The embodiment of the present invention also realizes the remote-copying.

In order to solve the above conventional problems, the present invention provides each data storage subsystem with an attribute information copying function, which uses the same data path as that of the data remote-copying function between data storage subsystems.

Each data storage subsystem is also provided with the following functions; an update serial number is added to each of data and attribute information on the subject original side and the data and attribute information are updated on the duplicate side in the order of the serial numbers.

Each data storage subsystem is further provided with the following functions; attribute information updated while the remote-copy stops is stored in both original and duplicate side data storage subsystems and only the updated part of the attribute information is copied after the remote-copy restarts, thereby the attribute information is re-synchronized.

Each data storage subsystem is still further provided with the following functions; the original side data storage subsystem copies target attribute information as many as the number of duplicate side data storage subsystems and sends the information to each of the duplicate side subsystems separately. In this connection, each data storage subsystem is also provided with a secondary remote-copy function that enables primary updated attribute information received from a subsystem to be remote-copied into another subsystem.

According to the present embodiments, attribute information can be copied to a back-up data storage subsystem, so that the back-up side subsystem uses the attribute information automatically without intervention from the host computer. This eliminates complicated exchanges of attribute information between the host computers associated with the source subsystem and the destination subsystem.

Furthermore, according to the present embodiments, data and attribute information can be transferred to a destination data storage subsystem synchronously, i.e., in the order issued by the host computer, so that the data and the attribute information in the duplicate side subsystem can be updated with the received data and attribute information fast without the host computer involvement. If a difference occurs in any attribute information between stop of a remote-copy and restart of the remote-copy and/or between a forward remote-copy and its backward remote-copy, only the difference is copied without requiring the host computer involvement. Attribute information can thus be re-synchronized quickly between those stop and restart operations.

In addition, attribute information can be copied among a plurality of data storage subsystems, which makes it easier to remote-copy the attribute information among the plurality of data storage subsystems, thereby a system with higher error resistance properties can be formed more easily.

A method for copying information from a first storage subsystem to a second storage subsystem is disclosed according to one embodiment. The first and second storage subsystems are provided in a data storage system. The method comprises transmitting first data block from the first storage subsystem to the second storage subsystem, the first storage subsystem being associated with a first host computer and the second storage subsystem being associated with a second host computer; and transmitting first attribute information from the first storage subsystem to the second storage subsystem without intervention from the first host computer.

In another embodiment, a storage subsystem coupled to a host computer includes a first communication interface coupled to the first host computer via a first communication link; a storage controller to handle data requests from the first host computer; a storage unit coupled to the storage controller and including a storage area; and a second communication interface coupled to a remote storage subsystem via a second communication link that is different from the first communication link. The storage subsystem is configured to transmit first data block from the storage subsystem to the remote storage subsystem and to transmit first attribute information from the storage subsystem to the remote storage subsystem without intervention from the first host computer. The remote storage subsystem is associated with a second host computer.

In yet another embodiment, a computer readable medium for providing a remote replication function in a storage system includes code for transmitting first data block from a first storage subsystem to a second storage subsystem, the first storage subsystem being associated with a first host computer and the second storage subsystem being associated with a second host computer; and code for transmitting first attribute information from the first storage subsystem to the second storage subsystem without intervention from the first host computer. The storage system includes the first storage subsystem and the second storage subsystem.

As used herein, the term "data path" refers to any communication link that enables data to be transferred from one point to another point. Accordingly, the data path may be a simple communication link with a single switch or repeater or a complicated communication link involving a plurality of repeater, switches, routers, bridges, or a combination thereof, depending on the locations of the first and second storage subsystems and the computer storage system configuration.

As used herein, the term "data block" refers to any unit of data, e.g., a byte, a plurality of bytes, that are grouped together for storage, transmission, or processing purposes.

DETAILED DESCRIPTION OF THE INVENTION

Generally, remote-copy operations are performed either using synchronous or asynchronous transfer methods.

Figure 9:
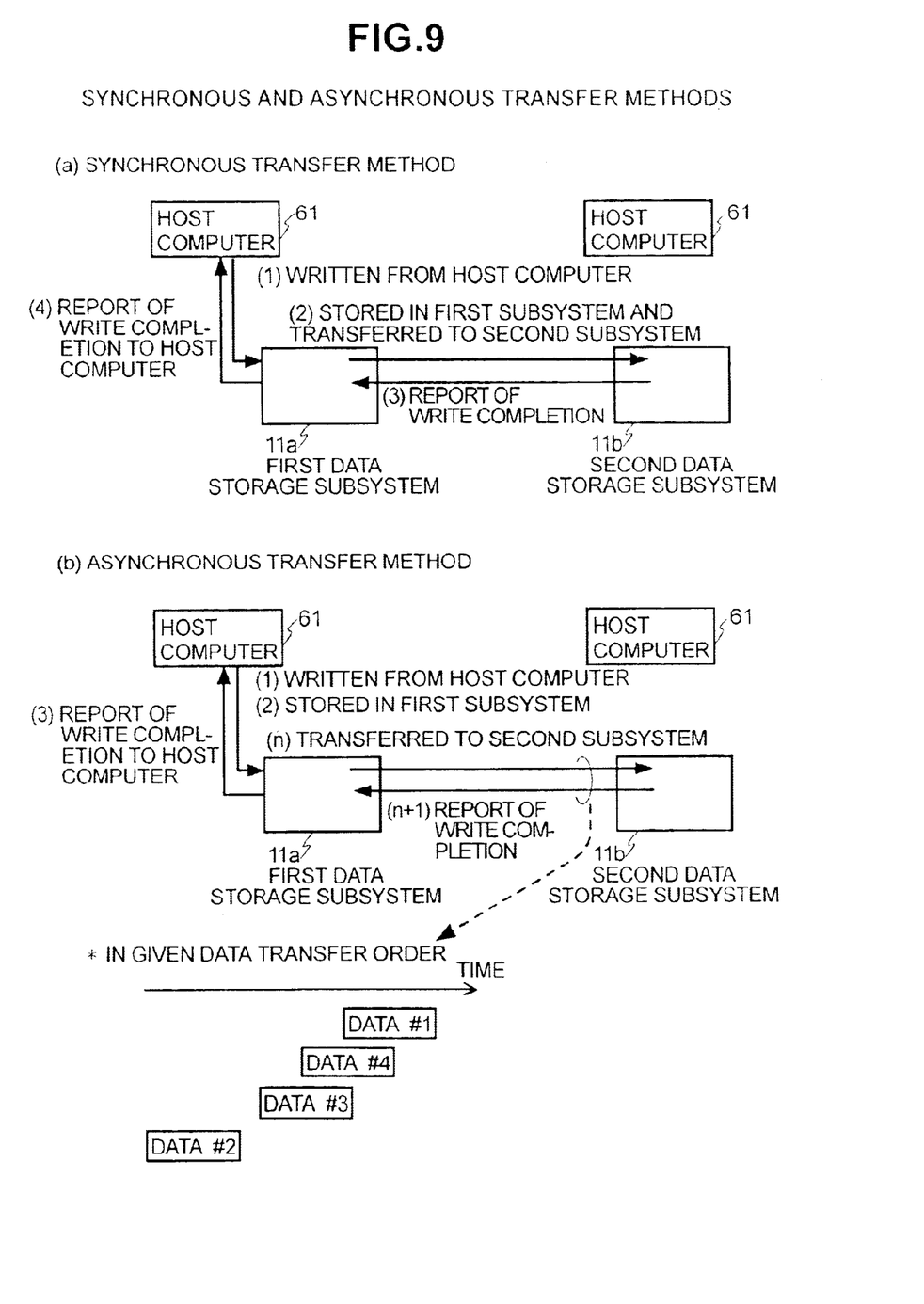
FIG. 9 illustrates synchronous and asynchronous transfer methods for remote-copy operation using block diagrams.

In a remote copy operation by the synchronous transfer method, a first data storage subsystem 11a receives an updated data block from a host computer 61 and transfers the data block to a second data storage subsystem 11b. In one embodiment, the storage subsystem is a disk array unit. In other embodiments, other types of storage units may be used as the storage subsystems. The second data storage subsystem 11b then notifies the first data storage subsystem 11a of the received data block. Upon receiving the notification, the first data storage subsystem 11a notifies the host computer 61 of completion of the writing of the updated data block. When any of the above process steps fails ("write error"), the first data storage subsystem 11a reports the write error to the host computer 61.

In a remote copy by the asynchronous transfer method, the first data storage subsystem 11a receives an updated data block from the host computer 61 and notifies the host computer 61 of completion of the updated data block writing within its storage area. The first data storage subsystem 11a transfers the data block to the second data storage subsystem 11b at an appropriate instance, i.e., asynchronously with the processing of the host computer 61. Accordingly, the order of receipt of data blocks at the destination may be different than the actual data block sequence due to congestion in a given data path in comparison to another data path.

FIG. 9B illustrates an asynchronous transfer method where the data blocks are transferred or received out of sequence. That is, the data blocks are transferred in the following order: Data #1, Data #4, Data #3, and Data #2. The data updating order (or sequence) is kept during this data transfer. The second data storage subsystem 11b sorts the data blocks it has received back to a proper sequence using the updating order information, so that the data blocks are rearranged in the following order: Data #1, Data #2, Data #3, and Data #4. This data updating order information (or sequence information) is kept in the second data storage subsystem even when an unexpected trouble occurs in the first data storage subsystem and/or the data path. Consequently, the host computer 61 connected to the second data storage subsystem 11b can recover the error that may occur in its data base and/or journal file system without conflict between them, e.g., the sequence of storing data into the storage subsystem is the same as the issuance of the data blocks. The asynchronous transferring method is effective for enhanced processing by the host computer 61, as well as extension of the distance between data storage subsystems. In addition, because the data updating order is assured, as described above, even when written or copied to remote sites, the data consistency between the database and the journal file system is obtained. This is because, even when data is received from a copy source at random, the remote site receives and stores the data and then sorts the data blocks after receiving a group of data blocks, e.g., all the data blocks.

<First Embodiment>

Figure 1:
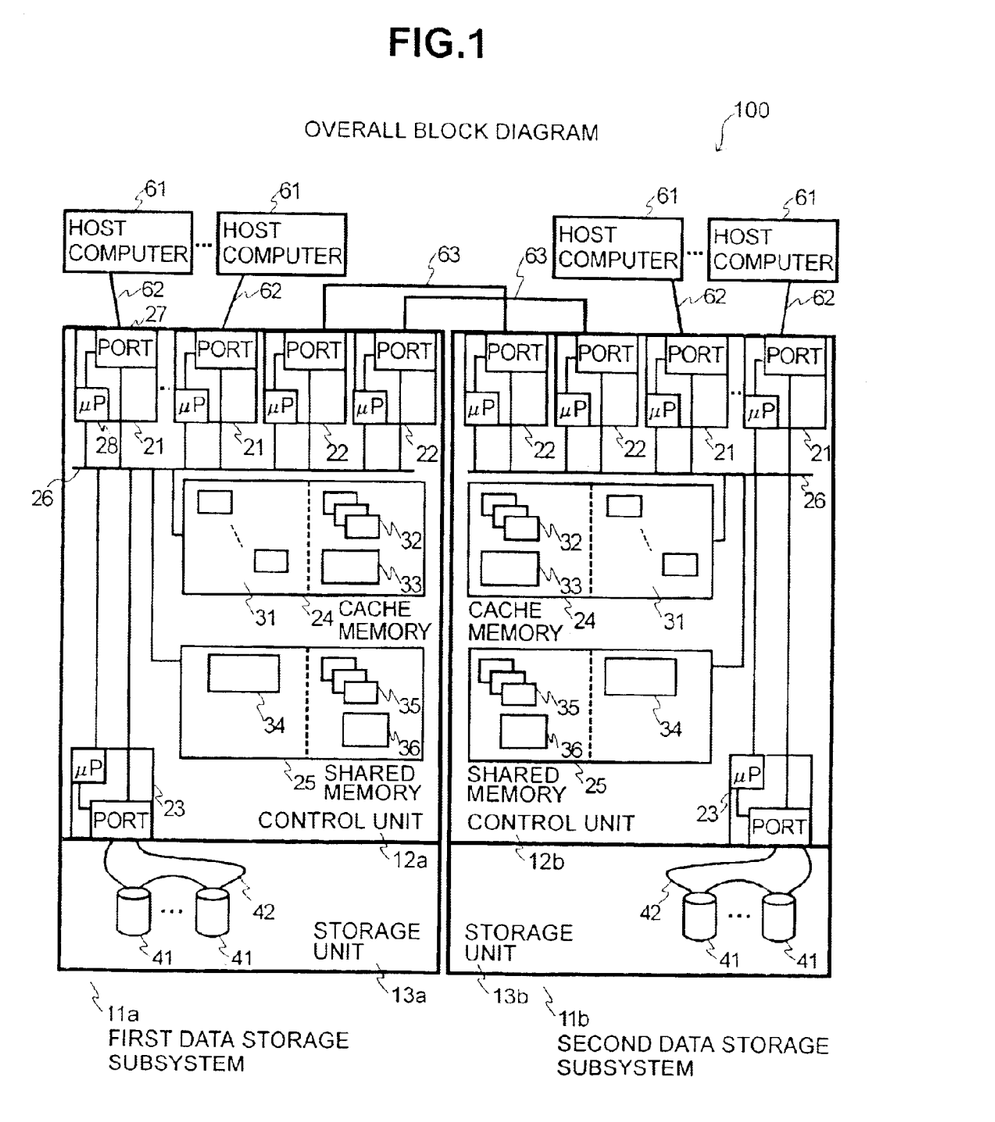
FIG. 1 is a schematic configuration of a data or computer storage system including a plurality of subsystems according to one embodiment of the present invention.

FIG. 1 shows a schematic block diagram of a computer or data storage system (or storage system) 100 according to a first embodiment of the present invention. The storage system 100 includes a first storage subsystem 11a and a second storage subsystem 11b (The storage subsystems (also referred to simply as "subsystems") 11a and 11b are connected to each other through a communication link or data path 63 to exchange information. The subsystems may be disposed closely to each other, i.e., within the same building or room, or far away from each other, e.g., in different cities.

Each subsystem 11a, 11b is connected to a plurality of host computers 61 through a host access bus 62. Each subsystem 11a, 11b includes a storage controller 12 (or control unit 12) used to handle data read/write requests and a storage unit 13 including a recording medium for storing data in accordance with write requests.

The control unit 12 includes a host channel adapter 21 coupled to a host computer, a subsystem channel adapter 22 coupled to another subsystem, and a disk adapter 23 coupled to a storage unit 13 associated with the that control unit.

In the present embodiment, each of these adapters includes a port 27 to send/receive data and a microprocessor 28 to control the data transfers via the port 27. However, more than one ports and processors may be used for some or all of the adaptors to speed up the data transfer rate.

The control unit 12 also includes a cache memory 24 used to temporarily store data read from or to be written to the storage unit 13 and a shared or common memory 25. The processors in the adaptors to temporarily store data in this shared memory 25 to process the data inputs and outputs. The adapters are coupled to the cache memory 24 and the shared memory via a bus 26.

In one embodiment, the storage unit 13 is a disk array unit including a plurality of magnetic disk drives 41. Those drives are connected to the disk adapter 23 of the control unit 12 through a disk input/output bus 42.

Each subsystem provides a plurality of logical volumes as storage areas for the host computers. The host computers use the identifiers of these logical volumes to read data from or write data to the storage subsystem. The identifiers of the logical volumes are referred to as Logical Unit Number ("LUN"). The logical volume may be included in a single physical storage device or a plurality of storage devices. Similarly, a plurality of logical volumes may be associated with a single physical storage device.

<General Process>

Next, the processing by the control unit 12 will be described briefly. It is assumed here that data is remote-copied from the first subsystem to the second subsystem. That is, the first storage subsystem is assumed to be a source subsystem or primary site and the second storage subsystem is assumed to be a destination or secondary site for illustrative purposes. In one embodiment, a subsystem can be both source and destination for different logical volumes. Also, the two or more remote copy processes can be conducted simultaneously, so that first and second subsystems may be both source and destination sites at the same time for different logical volumes.

The channel adapter 21, upon receiving a write request from a host computer 61, stores the target data (as cache entries 31) in the cache memory 24. Subsequently, the microprocessor in the disk adapter 23 writes those cache entries in the magnetic disk and stores the data there at a suitable time independent of the processing of other microprocessors.

For the synchronous transfer method, the channel adapter 21 sends a transfer request to the channel adapter 22 connected to the second subsystem 11b, so that data is transferred synchronously between those channel adapters 21 and 22, as described above. At this time, the channel adapter 22 of the second subsystem 11b updates each target cache entry 31 in the cache memory according to the received data item.

For the asynchronous transfer method, the microprocessor in the channel adapter 21 connected to the first subsystem 11a stores updated data other than the cache entry 31 in another area in the cache memory 24 as updated data 32. The microprocessor then reports completion of the handling of the write request to the host computer 61 that had sent the write request. The microprocessor in the channel adapter 22 connected to the second subsystem 11b transfers the information 32 to the second subsystem 11b at a suitable time independent of other microprocessors. Before the transfer, the adapter 22 assigns a serial number to the write request issued from the host computer for the updated data 32, so that the data block associated thereto can be assigned with sequence information that can be used to sort the data block in a proper order at the destination subsystem.

The channel adapter 22 coupled to the second subsystem 11b stores the transferred data in another area in the cache memory as updated data 32, then updates the cache entries 31 of the updated data 32 on another schedule in the order of the issued sequential request numbers. Generally, consecutive numbers are used for the sequential request numbers.

In the remote-copy methods described above, the microprocessor in the disk adapter 23 writes each cache entry 31 including an address tag and data in an area in the corresponding magnetic disk drive at the second subsystem 11b side on its on schedule independently of other processors and stores the data to complete the write request.

As described above, in the subsystem, writing in a magnetic disk drive is done independently of the processing to be performed with respect to the host computer and remote-copy process. Consequently, no description will be made for any component of the disk adapter 23 and the storage 13 in this specification.

On the other hand, the host computer 61 may request a subsystem to execute a process other than read and write requests. The requested process is executed by the microprocessor in a channel adapter of the subsystem in cooperation with other microprocessors, as needed. The results of the process are stored as attribute information in an attribute information table 34 in the shared memory. The results generally vary depending on the attribute. For example, in a case of "reserve" attribute, the volume on the second subsystem cannot be accessed as same as the first volume, except by the reserving host, thereby protecting the second volume while the reserving host updates the critical data. The attribute information is managed generally for each logical volume. An example of such process is reservation setting for a logical volume as described with respect to the conventional techniques. In one embodiment, an attribute information is data stored in a storage subsystem that relate to a volume, where the data body can be addressed by hosts for reading or writing.

<Process According to the Present Embodiments>

Next, a description will be made for processing specific to the control unit of the present embodiment. The control unit of the present invention functions as part of the remote-copy function to transfer write data received from the host computer, as well as the above described attribute information so as to keep the attribute information consistency between different subsystems. The host computer expects requests for generating attribute information, as well as ordinary write requests to be processed by subsystems, in the right order as the requests are issued. Consequently, each data storage subsystem of the present embodiment is configured, so that data or attribute information is updated sequentially in the same order as the issuance of the corresponding requests regardless of whether the request is for generating attribute information or for executing an ordinary write process.

Figure 2:
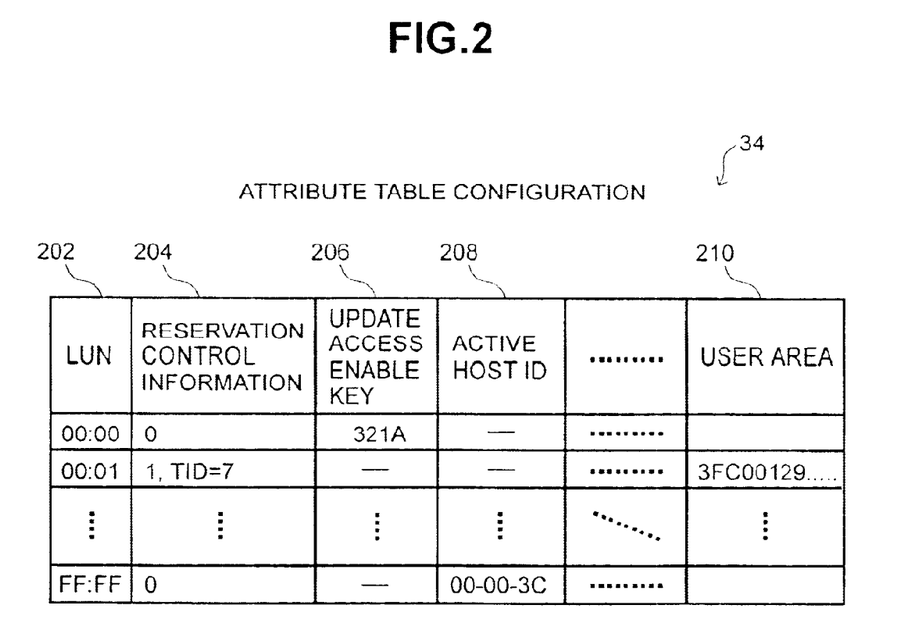
FIG. 2 is a configuration of an attribute information table according to one embodiment of the present invention.

Hereinafter, an ordinary data write request to be issued from a host computer will be referred to as an "update command" and other requests, for example, issued to generate attribute information, will be referred to as "control commands". For purposes of describing the present embodiment, the devices and components associated with the first storage subsystem are referred to as "first device" or "first component." Similarly, the devices and components associated with the second storage subsystem are referred to as "second device" or "second component." That is, the cache memory 24 in the first subsystem is referred to as the "first cache memory 24," and the cache memory 24 in the second subsystem is referred to as the "second cache memory 24." FIG. 2 shows a configuration of the attribute information table 34. The table 34 stores the attribute information of each logical volume. A column 202 stores the LUN information; a column 204 stores a flag that provides information as to whether a LUN associated thereto is reserved or not reserved; a column 206 stores an update access enable key for updating the data of associated LUN; and a column 2089 stores active host ID information.

Part of the table or a column 210 is reserved as a user area column, in which a program running in the host computer connected to the corresponding subsystem can store given attribute information to be set/stored with respect to each logical volume through a dedicated application interface (hereinafter, also described as "API"). Consequently, the program comes to easily manage its specific access control, etc. on its own method. The access control, etc. are not supported by the control unit of any subsystem.

Figure 3:
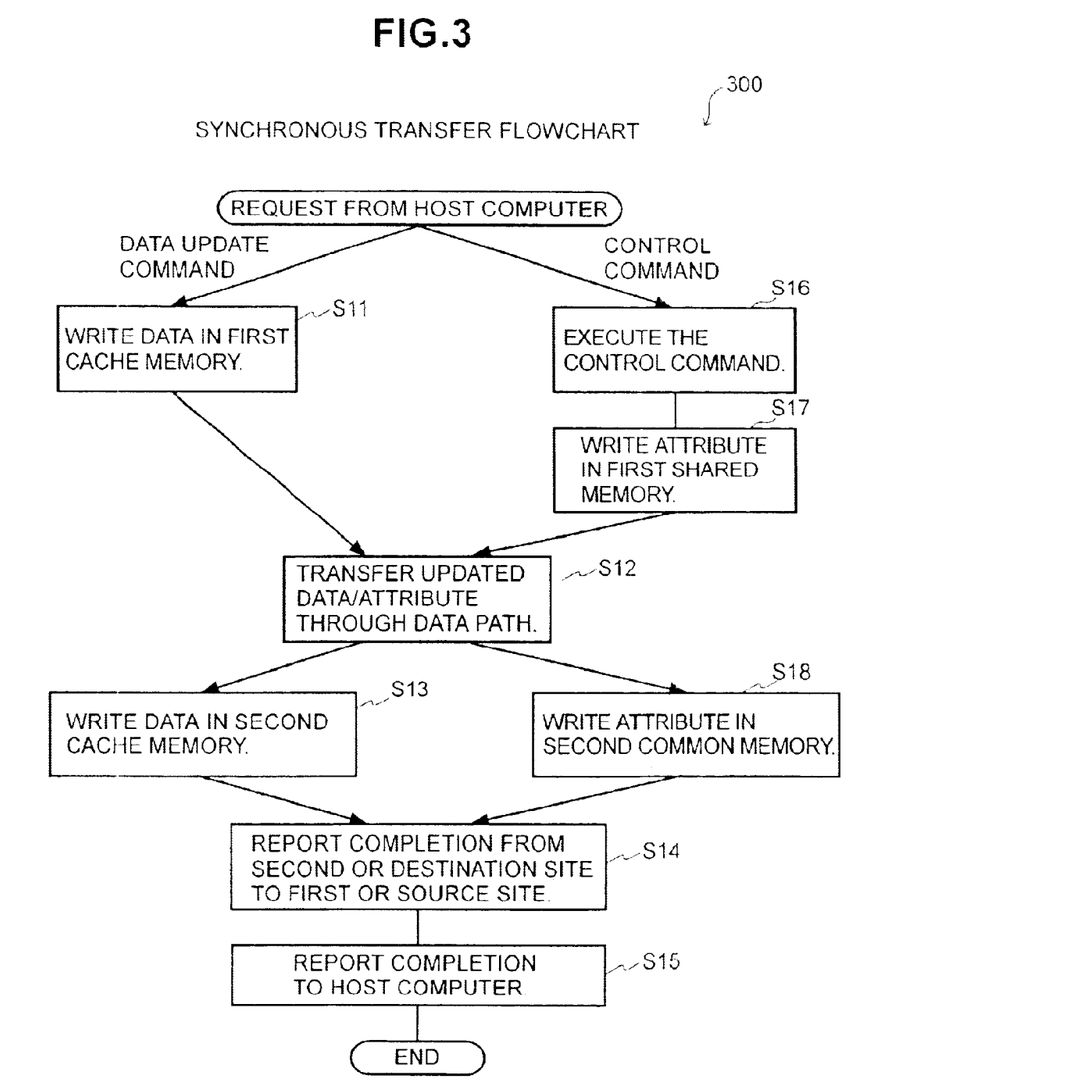
FIG. 3 a process for performing a synchronous transfer remote-copy operation according to one embodiment of the present invention.

FIG. 3 shows a process 300 for processing a request from the host computer 61 involving a synchronous remote-copy operation. The host computer 61 issues the request to the channel adapter 21 of the first subsystem as a SCSI protocol command. The microprocessor 28 (FIG. 1) of the channel adapter 21 then determines the command type. If the command is an update command, the microprocessor 28 writes the command as a cache entry 31 in the first cache memory 24 (step 11). If the command is a control command, the microprocessor 28 executes the process specified by the command (step 16). The attribute information of the logical volume generated by the process is stored in the attribute information table 34 in the first shared memory 25 (step 17). The microprocessor 28 of the channel adapter 22 then transfers the updated information to the second channel adapter 22 through the data path 63 in response to a request from the first channel adapter 21 (step 12).

At this time, the microprocessor 28 of the second channel adapter 22 can determine whether the updated information is data or attribute information according to the flag set in the updated information. If it is data, the microprocessor 28 writes the data as a cache entry 31 in the second cache memory 24 (step 13). If it is attribute information, the microprocessor stores the information in the attribute information table 34 in the second shared memory 25 (step 18). The second channel adapter reports to the first channel adapter that the transfer has been completed (step 14). The first channel adapter reports to the host computer that had sent the request that the data transfer or copy has been completed (step 15).

In one embodiment, the above process sequences are controlled, so that only one process (usually the one that has been requested the earliest) is executed for a logical volume at a time. Handling of subsequent requests are suspended or they are regarded as errors while handling the earlier request. Consequently, both the data and attribute information are updated in the second subsystem according to the order of requests issued in the first subsystem. In one embodiment, the common sequences of data and attribute are also maintained.

<Updated Information Transfer>

The updated information transfer operation will further be described. In this first embodiment, the SCSI protocol is used in the data path 63. The port 27 of the first channel adapter 21 initiates a transfer of updated information to the port 27 of the second channel adapter 21.

Figure 5:
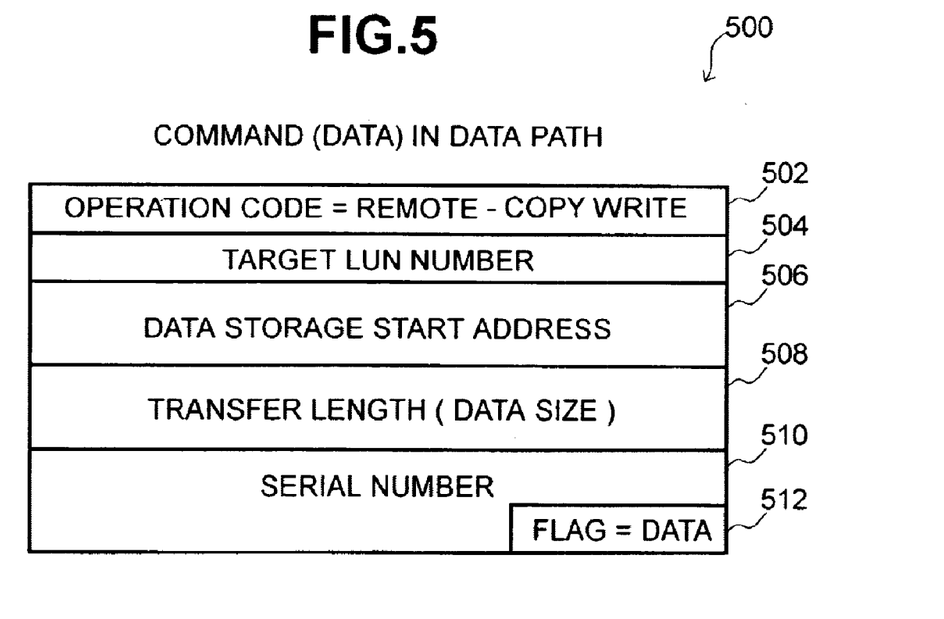
FIG. 5 is a write command for updated data in a data path according to one embodiment of the present invention.

FIG. 5 shows a configuration of a first SCSI command 500 for sending updated data according to one embodiment. The command 500 includes an operation code 502 wherein a remote-copy write parameter is provided, a target LUN number 504 identifying a destination logical volume, a start address 506 providing the address of the initial location in the target logical volume where the updated data is to be written, and a transfer length 508 providing the size of the data to be transferred or written.

In a synchronous remote-copy method, serial number section 510 is not used. In this embodiment, because both of the updated data and updated attribute information are sent, a flag field 512 that distinguishes between the data and the attribute information is provided in the command. The flag field 512 is set as a "data" flag. When a data command is received by the second channel adapter, the data content is sent in the next data transfercycle.

Figure 6:
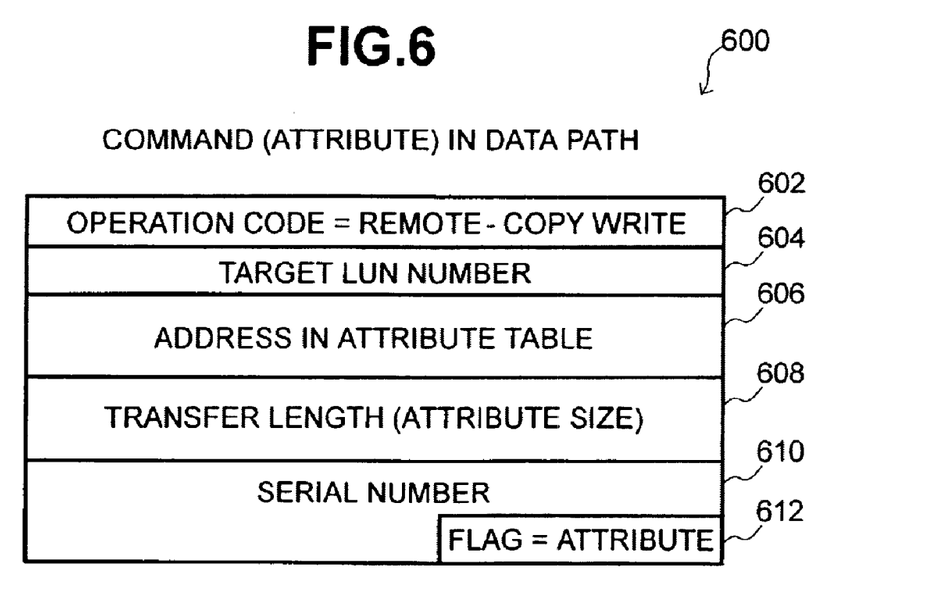
FIG. 6 is a write command for updated attribute information on the data path according to one embodiment of the present invention.

FIG. 6 shows a configuration of a second SCSI command 600 used to send updated attribute information according to one embodiment. The command 600 includes an operation code 602 wherein a remote-copy write parameter is provided, a target LUN number 604 identifying a destination logical volume, an address field 606 providing an address within the attribute table where the attribute information is to be stored, and a transfer length 608 providing the size of the attribute information. In a synchronous transfer remote-copy, a serial number field 610 is not used. A flag field 612 is set to indicate an "attribute information" flag. When this command is received by a second channel adapter, the actual attribute information is sent in the next data transfer cycle.

In one embodiment, it is possible to store the updated attribute information in a specific area (e.g., vender specific area, part of the address field, etc.) of a SCSI command since the attribute information is usually small in capacity. An ID that denotes the attribute information type may be used instead of using the fields 606 and 608, i.e., an address in the table and a transfer length.

Figure 4:
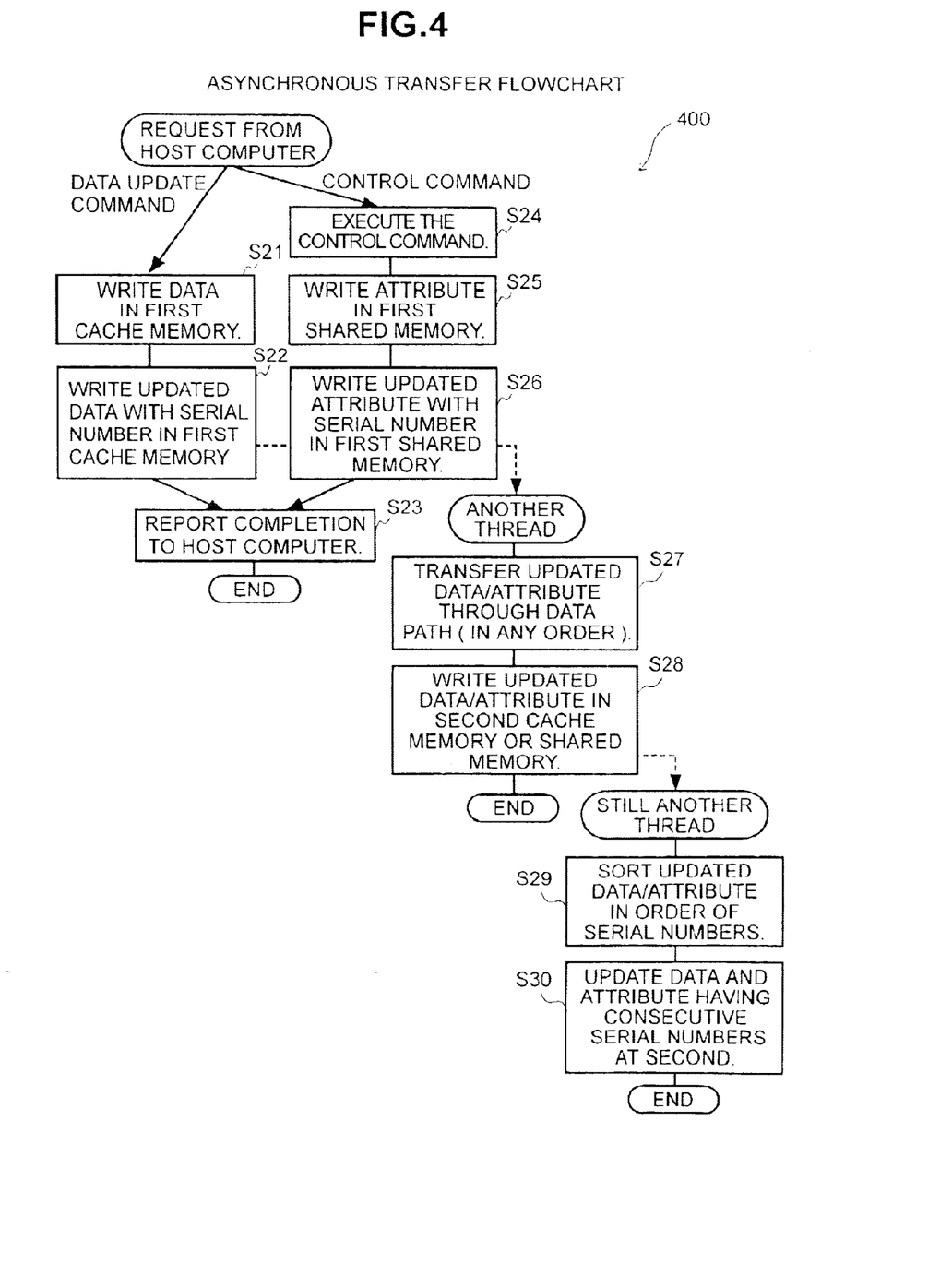
FIG. 4 is a process for performing an asynchronous transfer remote-copy operation according to one embodiment of the present invention.

FIG. 4 shows a process 400 for handling a request from the host computer 61 involving an asynchronous transfer remote-copy operation. As in the synchronous transfer remote-copy above, the microprocessor 28 of the first channel adapter 21 (FIG. 1) of the first subsystem 11a determines the command type. If the command is an update command, the microprocessor 28 writes the command as a cache entry 31 in the first cache memory 24 (step 21). If the command is a control command, the microprocessor 28 executes the process specified by the command (step 24) to store the attribute information generated by the process in the shared memory 25 (step 25). Furthermore, if the command specifies updated data, the microprocessor 28 writes the updated data 32 in another area in the first cache memory 24 (step 22). If the command is a control command, the microprocessor 28 writes the information related to the updated attribute information in the shared memory 25 as updated attribute information 35 (step 26). The sequential numbers or sequence information are assigned to the updated data and updated attribute information in the steps 22 and 26, so that they can be sorted in a proper order at the second storage subsystem (the mutual order of data and attributes are maintained).

The updated information includes first information relating to the command (see, FIGS. 5 and 6) and second information relating to actual content or body of the data or attribute information. The updated information is provided with a serial processing number that denotes an order for updating both of data and attribute information with respect to the subject logical volume. In one embodiment, instead of assigning such a sequential number to each logical volume, such a serial processing number is provided for each logical volume group, the each group including a plurality of logical volumes set similarly at both of first and second sites in advance. Consequently, the updating order is assured in the remote-copy operation even for a program that uses a plurality of logical volumes.

The term "assuring an order" means that received data/attribute information is sorted in a proper order at a receiving side or the second subsystem. In other words, the order of the requests issued from a host computer is kept by properly sorting the data/attributes received at the second subsystem. More concretely, even when a copy of data/attribute information is terminated for any reason, every data/attribute information updated before that point of time is updated accurately at the destination site (the second subsystem). The data or attribute information thereafter is not updated at the second subsystem. If data or attribute information is lost during the transmission , the data transfer is regarded as an error and the process stops or the transmission is reinitiated.

After that, the microprocessor 28 of the channel adapter 22, which operates on its own data processing cycle, transfers the updated data 32 read from the cache memory or the updated attribute information 35 read from the shared memory to the second channel adapter 22 in a given order (step 27). If the updated information is data, the microprocessor 28 of the second channel adapter 22 writes the received updated information in the second cache memory 24 as updated data 32. If it is attribute information, the processor 28 writes the information in the second shared memory 25 as updated attribute information 35 (step 28).

Thereafter, the microprocessor 28 of the second channel adapter sorts the above updated information (data and attribute information) according to the sequential numbers in a logical volume or a logical volume group (step 29). The microprocessor begins updating of the data/attribute information when sequential numbers become consecutive again just like the synchronous transfer remote-copy (in step 13 or 18) (step 30). Also at the destination site, this process updates data and attribute information in a logical volume or logical volume group according to the order the requests are issued.

In some instances, one control command generates a plurality of attributes. In such a situation, the microprocessor 28completes the transfer of the attribute information by repeating the process steps 17, 12, and 18 in FIG. 3 if the remote-copy operation is a synchronous transfer method. If a remote-copy operation is an asynchronous transfer method, the microprocessor 28 completes the storing of every attribute information by repeating the process steps 25 and 26 in FIG. 4 and then report to the host computer.

In the above description, it is premised that each command for updating data/control command from the host computer includes just one request. However, one command may include a plurality of control instructions, and the data update command may include a control instruction. In such a case, in a synchronous transfer method, the microprocessor completes all the processing (steps 16, 17, 12, 18, and 14) related to the control instructions, updates the target data (steps 11, 12, 13, and 14), then reports the completion of the processing to the host computer (step 15). When in a remote-copy operation by an asynchronous transfer method, the microprocessor 28 completes the processing (steps 24, 25, and 26) related to all the control instructions, updates the target data (in steps 21 and 22), then reports the completion of the processing to the host computer (step 23).

<Stop and Direction Change>

Next, stop and direction change processes of a remote-copy operation will be described with reference to FIG. 7. Remote-copy conditions are managed for each logic volume. The "normal" state means that both original and duplicate sides are synchronized, that is, data consistency is kept in every non-updated data between those two sides and only updated data is copied from the first site to the second site (FIG. 7(a)). In this state, the duplicate side host computer cannot update the data in any other logical volume, so that data consistency is kept between the original or first site and duplicate or second site.

Figure 7:
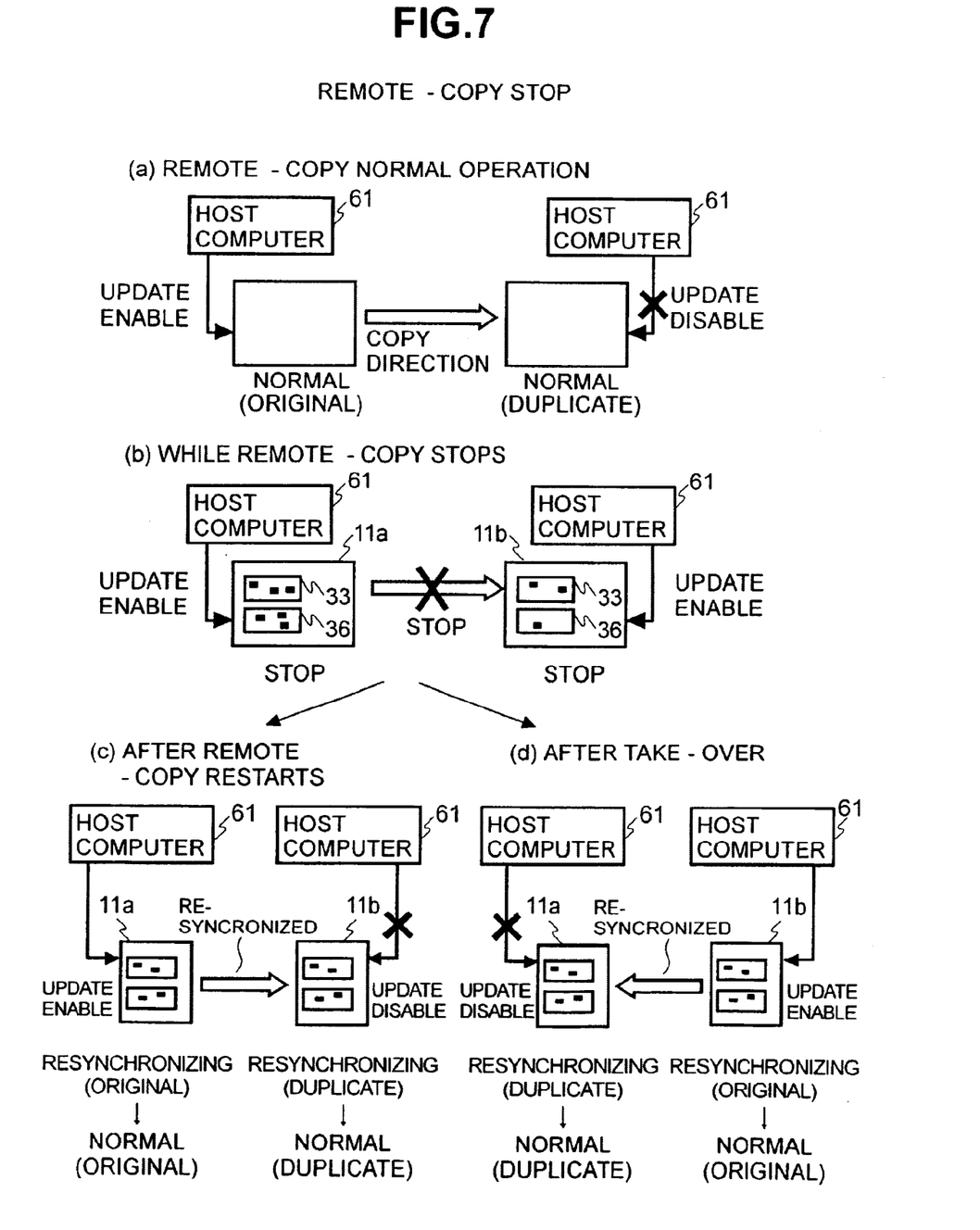
FIG. 7 illustrates a remote-copy stop using block diagrams.

In the normal state, a remote-copy operation can be stopped by an instruction from a program, for example, as shown in FIG. 7B. In this "stop" state, the second host computer can also update the data in the target logical volume, thereby the second host computer can back up data and perform a test for a program under development while a program is running in the first host computer. The stopped remote-copy operation can be restarted by a command from the program (FIG. 7C) in the same direction or in the reverse direction (take-over) FIG. 7D.

In any of the above cases, the location of data or attribute information updated during the "stop" state is recorded in both first and second subsystems (numerals 33 and 36 in FIG. 7B). In this connection, the current values set in the first subsystem is copied to the second subsystem only with respect to the updated data or attribute information in any of the subsystems, thereby the copy state of the subject logical volume is restored to the "normal". This operation is referred to as "resynchronization". This operation can reduce the recovery time to the "normal state" when only updated information is copied. Because the second logical volume is not assured for consistency until the resynchronization operation is completed, the updating order becomes meaningless, and accordingly, the copying is done at random.

The description for the recording of updated data locations in the "stop" state will further be continued below. The cache memory 24 stores a bit map 33 (FIG. 1) used to record the location of each updated data. The bit map includes an update flag bit to be set for each logical volume management unit (track/cylinder/a group including a plurality of cylinders). If data is updated during the "stop" state, the update flag bit is set corresponding to the management unit including the data. When in a resynchronization operation, the data in the whole management unit for which the update flag bit is set in any of the original and duplicate side subsystems is copied from the first site to the second site.

On the other hand, in addition to recording of updated data locations described above, updating management and resynchronization of attribute information are added to the bit map 33 in this embodiment. Management of updated attribute information uses an updated attribute information table 36 for recording the location of each updated attribute information in the common memory 25. The configuration (rows and columns) of the table 36 is similar to that of the attribute information table 34 shown in FIG. 2. In each row, an update flag bit for denoting completion of attribute information updating is set instead of the attribute information itself.

Each subsystem clears the update flag in every column corresponding to the subject logical volume when the remote-copy operation goes into the "stop" state. In the "stop" state, the processor of the channel adapter in which attribute information is to be updated updates the contents of the attribute information and sets the update flag in the corresponding updated attribute information table. At the time of resynchronization, the current value of the attribute information denoted by the update flag is copied to the duplicate side with respect to every update flag set data in the updated attribute information table in any of the connected subsystems, thereby data consistency is kept among all the connected subsystems.

In any of FIGS. 7C and 7D, both data and attribute information updated in a subsystem are copied from the first subsystem to the second subsystem, then the data and the attribute information at both subsystems are resynchronized. Thereafter, the normal state is restored in both subsystems.

<Second Embodiment>

Figure 8:
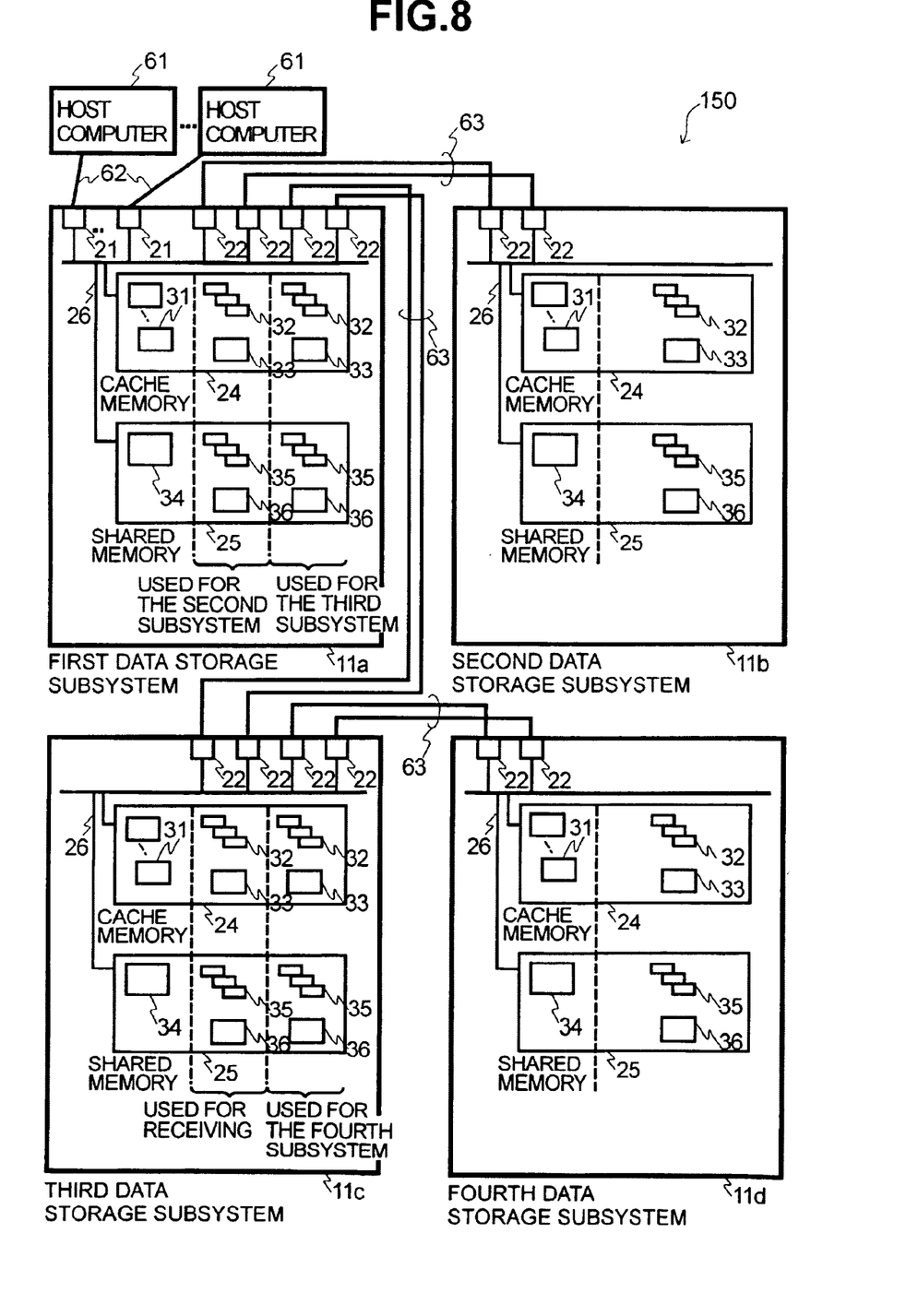
FIG. 8 shows a data storage system including a plurality of storage subsystems according to another embodiment of the present invention.

FIG. 8 illustrates a storage system 150 according to a second embodiment of the present invention. The storage system 150 includes first, second, third, and fourth data storage subsystems 11a to 11d. For illustrative purposes, the same numbers as in FIG. 1 are used for similar devices and components in the system 150. The control unit 12, the storage unit 13, the disk adapter 23, as well as the port 27 and the microprocessor 28 in each adapter, the magnetic disk drive 41, and the disk input/output path 42 are similar to those in the first embodiment. The description for those items will thus be omitted here. In this embodiment, a data path 63 is used for the connection among the first, second, and third subsystems 11a, 11b, and 11c, as well as between the third and fourth subsystems 11c and 11d. In this configuration, a logical volume used by the host computer connected to the first storage subsystem 11a can be remote-copied to other three destination subsystems (the second, third, and fourth subsystems). Concretely, a remote-copy operation is done from the first subsystem to both of the second and third subsystems in parallel and the third subsystem transfers the updated information received from the first subsystem to the fourth subsystem with use of the remote-copy function.

Next, the operation of the first subsystem will be described.

In a synchronous transfer remote-copy as described above with reference to the process 300 of FIG. 3, the first subsystem sends updated information to all the destination subsystems through the data path (step 12) and receives reports of completion of the updated information from the destination subsystems. The first subsystem then notifies the host computer 61 of the completion of the transfer (step 15).

On the other hand, in an asynchronous transfer remote-copy as described above with reference to the process 400 of FIG. 4, the first or source subsystem, while writing updated data 32 in the source cache memory 24 or updated attribute information 35 in the source shared memory 25, secures an area for each of the destination subsystems and writes the same information in them, respectively (steps 22 and 26). Thereafter, the first or source subsystem sends updated information to each of the destination subsystems independently.

In any case, copy operation can be suspended for each target subsystem separately, so that the update bit map 33 and the update attribute information table 36 that manage updated information during the suspension of copy operation may be prepared as many times as the number of the duplicate- side subsystems.

Due to the processes described above, data and attribute information are remote-copied to a plurality of subsystems.

Next, the operation of the third subsystem will be described. In a synchronous transfer remote-copy from the first subsystem, the second subsystem regards updated information received from the first subsystem as a data update or control command issued from the host computer and accordingly remote-copies the target data to the fourth subsystem. The remote-copy to the fourth subsystem is the same as the synchronous or asynchronous transfer remote-copy described in the first embodiment.

When a remote-copy from the first subsystem is an asynchronous transfer method, however, the third subsystem usually makes an asynchronous transfer remote-copy to the fourth subsystem since the synchronization with the request sender host computer is not available. In this connection, the third subsystem buffers the updated information received from the first subsystem, so as to update itself and stores it as the same number as the target subsystems that this subsystem further send the updated information. This updated information stored differently is then subjected to the process steps to be executed after the transfer of updated information through the data path (step 27), as explained in the process 400 of FIG. 4 in connection with the first embodiment. The cache memory 24, therefore, comes to store two types of received updated information 32 (to be used in itself and to be sent to the fourth subsystem). The shared memory 25 comes to store two types of received updated information 35 (to be used in itself and to be sent to the fourth subsystem).

In any case, a remote-copy operation can be suspended for receiving side (between the first subsystem and the third subsystem) and the sending side (between the third subsystem and the fourth subsystem) independently. The number of the update bit maps 33 and the number of the update attribute information tables 36 are prepared to manage updated information during the stop as many as the number of target subsystems.

Due to the processing as described above, therefore, data and attribute information are remote-copied secondarily from a duplicate side subsystem to another subsystem.

When a plurality of the mechanisms in this embodiment is combined, data and attribute information can be remote-copied among a given number of subsystems.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A method for copying information from a first storage subsystem to a second storage subsystem, the first and second storage subsystems being provided in a data storage system, the method comprising:

determining whether or not a first command received at a first storage subsystem from one of a plurality of first hosts is an update command or control command, the first storage subsystem being coupled to a plurality of first hosts, the first subsystem including a storage unit, a storage controller, first communication interfaces coupled to the plurality of first hosts, a second communication interface coupled to the second storage subsystem;

writing data associated with the first command to a first cache memory of the first storage subsystem if the first command is determined to be an update command, the data written to the first cache memory including a first data block;

executing the first command at the first storage subsystem if the first command is determined to be a control command, where first attribute information is obtained by executing the first command;

transmitting the first data block from the first storage subsystem to the second storage subsystem, the second storage subsystem being associated with a second host;

storing the first attribute information associated with the first control command to a first shared memory of the first storage subsystem; and transmitting the first attribute information from the first storage subsystem to the second storage subsystem without direct involvement from the first hosts, wherein the first and second hosts are coupled to each other via a first communication link to exchange information therebetween, and the first and the second storage subsystems are coupled to each other via a second communication link that is different from the first communication link, the second communication link being used to transmit the first data block and the first attribute information from the first storage subsystem to the second storage subsystem.

2. The method of claim 1, further comprising:

storing the first data block to a first cache of the first storage subsystem prior to transmitting the first data block to the second storage subsystem;

storing the first data block received from the first storage subsystem to a second cache memory of the second storage subsystem; and storing the first attribute information received from the first storage subsystem to a second shared memory of the second storage subsystem.

3. The method of claim 2, wherein the second storage subsystem includes a plurality of ports, the plurality of ports having access to the second shared memory.

4. The method of claim 2, further comprising:
transmitting a notification to the first storage subsystem that at least one of the first data block and the first attribute information has been successfully received by the second storage subsystem.

5. The method of claim 1, wherein the storage unit has a plurality of disk drives.

6. The method of claim 1, wherein the storage system includes a storage area network.

7. The method of claim 1, further comprising:
transmitting a second data block from the first storage subsystem to the second storage subsystem, the second data block being associated with another command;
transmitting a third data block from the first storage subsystem to the second storage subsystem, the third data block being associated with yet another command; and
sorting at the second storage subsystem the received first, second, and third data blocks in the order corresponding the commands issued by one or more of the first host computers to the first storage subsystem.

8. The method of claim 7, wherein the second subsystem sorts the first, second, and third data blocks using sequence information assigned to the first, second, and third data blocks, respectively.

9. The method of claim 1, wherein the first storage subsystem is configured to perform synchronous data transfers.

10. The method of claim 1, wherein the control command relates to replication of the first data block in the remote storge subsystem, the control command being a command other than a write command,
wherein the first attribute information includes at least one of the following: tag information used to identify a logical volume, identification information of a host computer that is accessing the logical volume, host information relating to a port of the host computer provided with access to the logical volume, port information relating to a port of the host computer provided with access to the logical volume, reservation control information for the logical volume, and key information enabling the logical volume to be updated.

11. The method of claim 10, further comprising:
storing the first data block a first storage area associated with the first storage subsystem; and
storing the first data block received from the first storage subsystem in a second storage area associated with the second storage subsystem,
wherein the second storage subsystem provides a back-up storage to the first storage subsystem.

12. A storage subsystem coupled to a plurality of host computers, the storage subsystem comprising:
a plurality of first communication interfaces coupled to the first host computers via a communication link of first type;
a shared memory configured to be accessible via the plurality of first communication interfaces, the shared memory being configured to store first attribute information obtained by executing a control command received from one of the first host computers;
a storage controller to handle data requests from the first host computers;
a storage unit coupled to the storage controller and including a storage area, the storage unit including a plurality of disk drives; and
a second communication interface coupled to a remote storage subsystem via a communication link of second type that is different from the communication link of first type,
wherein the storage subsystem is configured to transmit a first data block from the storage subsystem to the remote storage subsystem and to transmit the first attribute information from the storage subsystem to the remote storage subsystem without direct involvement from the first host computers, the remote storage subsystem being associated with a second host computer.

13. The storage subsystem of claim 12, wherein the storage subsystem is a disk array unit including a plurality of disk drives.

14. The storage subsystem of claim 12, the storage system further comprising:
a cache memory to temporarily store the first data block prior to transmitting the first data block to the remote storage subsystem.

15. The storage subsystem of claim 12, wherein the first data block and the first attribute information are transferred to the remote storage subsystem via the communicatior link of second type,
wherein the control command relates to replication of the first data block in the remote storage subsystem, the control command being a command other than a write command,
wherein the first attribute information includes at least one of the following: tag information used to identify a logical volume, identification information of a host computer that is accessing the logical volume, information relating to a host computer provided with access to the logical volume, port information relating to a port of the host computer provided with access the logical volume reservation control information for the logical volume, and key information enabling the logical volume to be updated.

16. The storage subsystem of claim 12, wherein the storage subsystem is provided within a storage system including a storage area network, wherein the host computers are servers configured to access the storage subsystem via the storage area network.

17. The storage subsystem of claim 12, wherein the storage unit includes a first logical volume and a second logical volume, one of the first host computer being configured to specify a write request and a control command that are directed to the first logical volume, the storage subsystem being configured to transfer the write request and the control command to the first logical volume, the remote storage subsystem being configured to store data corresponding to the write request and the attribute information corresponding to the control command in a third logical volume in the order the write request and the control command are issued by one of the first host computers the third logical volume being provided within the remote storage subsystem.

18. The storage subsystem of claim 17, the storage subsystem is a disk array unit.

19. A computer readable medium including a computer program for providing a remote replication function in a storage system, the storage system including a first storage subsystem and a second storage subsystem, the program comprising:

code for transmitting a first data block from the first storage subsystem to the second storage subsystem, the first storage subsystem being associated with a plurality of first host computers and the second storage subsystem being associated with a second host computer, the first subsystem including a storage unit including a plurality of disk drives, a storage controller, first communication interfaces coupled to the plurality of first hosts, a second communication interface coupled to the second storage subsystem;

code for executing a first control command received from one of the first hosts;

code for storing first attribute information associated with the first control command to a first shared memory, the first attribute information resulting from the execution of the first control command; and code for transmitting the first attribute information from the first storage subsystem to the second storage subsystem without direct involvement from the first host computers, wherein the first data block is obtained from an update command received from one of the first host computers.

* * * * *